United States Patent [19]

McMurtry

[11] Patent Number: 4,646,422
[45] Date of Patent: Mar. 3, 1987

[54] MACHINE TOOL

[75] Inventor: David R. McMurtry, Wotton-under-Edge, United Kingdom

[73] Assignee: Renishaw plc, Wotton-under-Edge, England

[21] Appl. No.: 555,881

[22] PCT Filed: Mar. 10, 1983

[86] PCT No.: PCT/GB83/00073

§ 371 Date: Nov. 9, 1983

§ 102(e) Date: Nov. 9, 1983

[87] PCT Pub. No.: WO83/03070

PCT Pub. Date: Sep. 15, 1983

[30] Foreign Application Priority Data

Mar. 10, 1982 [GB] United Kingdom ............... 8206951

[51] Int. Cl.⁴ .................. B23Q 3/157; B23Q 7/04
[52] U.S. Cl. ............................. 29/568; 82/2.7; 414/736
[58] Field of Search ............ 29/568, 26 A, 563; 82/2.5, 2.7; 414/590, 736

[56] References Cited

U.S. PATENT DOCUMENTS 3,477,121 11/1969 Martin ............................ 29/568
4,065,988 1/1978 Lohneis et al. .................. 82/2.7
4,404,727 9/1983 Zankl ............................. 29/568

FOREIGN PATENT DOCUMENTS 0028735  5/1981  European Pat. Off.
 479352 11/1969  Fed. Rep. of Germany.
2259372  4/1974  Fed. Rep. of Germany.
2951565  7/1981  Fed. Rep. of Germany.
 340111  9/1959  France.
2003807 11/1969  France.
2504037 10/1982  France.
 508203  6/1939  United Kingdom.
1202955  8/1970  United Kingdom.
1448749  9/1976  United Kingdom.
2075893 11/1981  United Kingdom.

Primary Examiner—Z. R. Bilinsky
Attorney, Agent, or Firm—Spencer & Frank

[57] ABSTRACT

A numerically controlled machine tool capable of milling and turning operations has a continuously rotatable first spindle (10) to which is releasably secured a work holder (50). A rotationally positionable second spindle (20) has releasably secured thereto a tool holder (60). For turning operations, the second spindle (20) is locked against rotation and has secured thereto a tool holder having a turning tool (61), the workpiece (51) being held by the work holder on the first spindle (10). For milling operations, the second spindle (20) is unlocked, the work holder (50) is secured to the second spindle (20), and a tool holder (60) with a milling tool therein is secured to the first spindle (10). The changeover of work and tool holders is done by a transfer mechanism which takes appropriate holders (60), as well as work blanks, from a magazine system. In a modification the second spindle (20) is also adapted for continuous rotation, and the first spindle (10) is lockable against rotation so that the workpiece is always held on the second spindle for machining by milling or turning tools on the first spindle.

8 Claims, 7 Drawing Figures

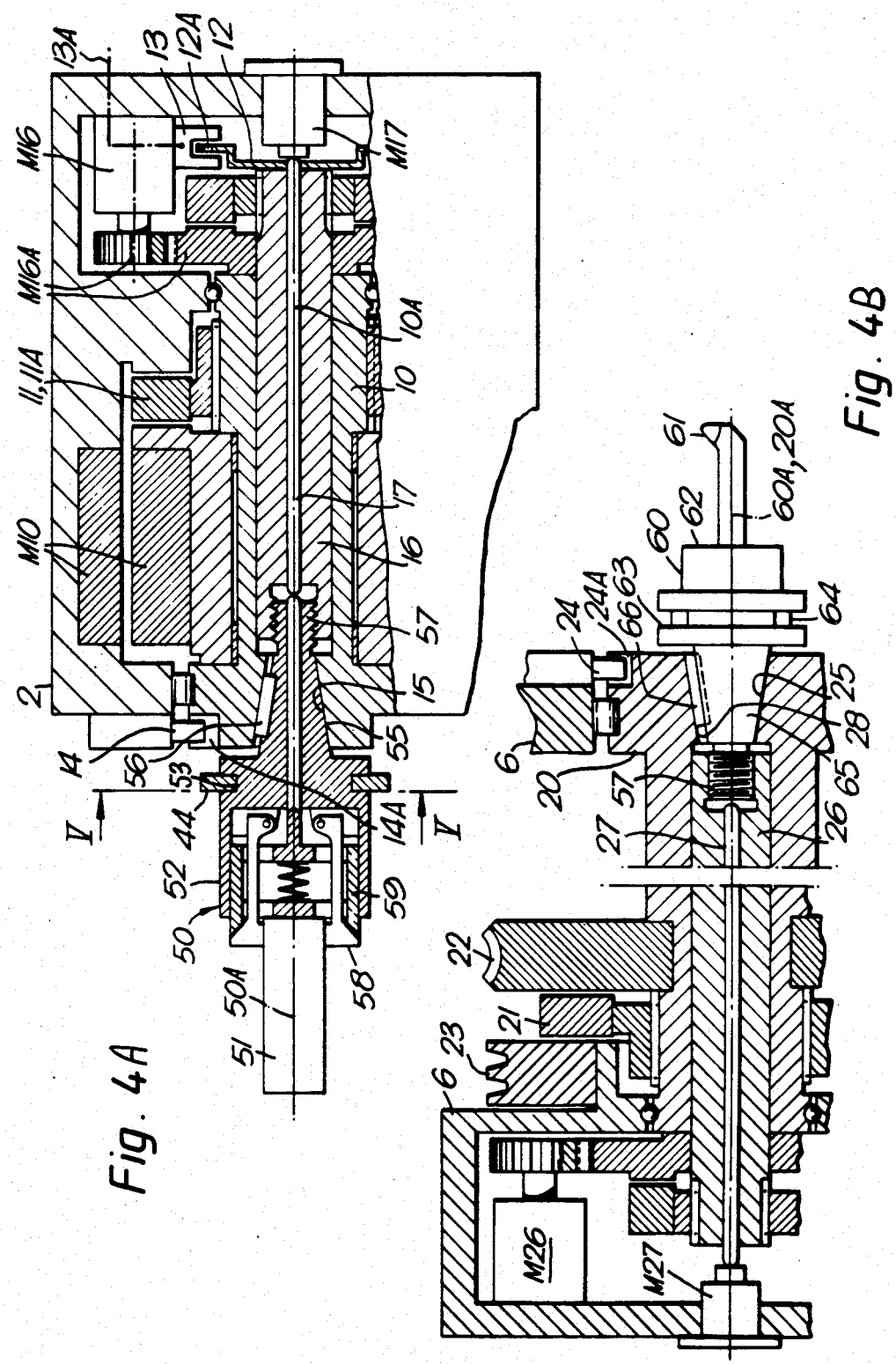

MACHINE TOOL

BACKGROUND OF THE INVENTION

This invention relates to a machine tool suitable both for the use of rotary cutting tools, e.g. milling cutters, and the use of stationary cutting tools, e.g. turning tools.

British Pat. No. 1,448,749 shows a lathe which has a headstock spindle for the support of a workpiece, a slide linearly positionable relative to the headstock spindle, an indexable turret supported on the slide, a stationary tool, viz. a turning tool, secured to the turret at one index station thereof, and a rotary cutting tool, viz. a milling cutter, provided at another said station. The headstock spindle is continuously rotatable for performing a turning operation on the workpiece by said turning tool. Further, the headstock spindle is, optionally, rotationally positionable, i.e. it is rotatable about its axis into predetermined angular positions, so that, for milling operations, the workpiece can be presented to the milling cutter at different angles about said axis. Regarding driving of the milling cutter, it is known practice in machines such as the above, to provide the cutter on a mounting releasably securable to the turret and including a continuously rotatable spindle having the cutter secured to one end thereof and provided at the other end with a driven gear meshing with a driving gear provided on the turret. Different such mountings have to be provided for milling operations requiring different angles between the axis of the headstock spindle and that of the cutter spindle. Also mountings different from those of the milling cutters have to be provided for those of any said turning tools.

It is among the objects of this invention to avoid the need for different said mountings and thereby reduce the cost of tooling and improve the versatility of the machine.

BRIEF DESCRIPTION OF THE INVENTION

According to this invention there is provided a method of operating a machine tool; the machine tool comprising two rotatable and relatively positionable spindles wherein a rotary cutting tool is securable to one of the spindles, a workpiece is securable to the other spindle, and at least said one spindle is rotatable for performing a cutting operation; the method comprising locking one of the spindles against rotation, securing a stationary cutting tool to the locked spindle, securing a workpiece to the remaining spindle, and rotating said remaining spindle for performing the cutting operation. The locking of one of the spindles makes it possible to change from an operation with the rotary cutting tool to an operation with the stationary cutting tool without the need for a turret. This, in turn, facilitates the relative positioning of the spindles to different angles between the spindle axes and in this way avoids the need for different mountings for different such angles. Also, the tool capacity of the machine is not limited to the capacity of a turret mounted on a slide.

According to a more specific aspect of the invention there is provided a method of operating a machine tool; in which machine tool one of said spindles is continuously rotatable the other spindle is rotationally positionable, said rotary cutting tool is securable to the continuously rotatable spindle and said workpiece is securable to the rotationally positionable spindle; the method comprising locking the rotationally positionable spindle against rotation and securing the workpiece to the continuously rotating spindle for performing the cutting operation against the stationary cutting tool secured to the locked spindle. In this method, the use of the rotary cutting tool requires that this tool is secured to the continuously rotatable spindle and the workpiece is secured to the rotationally positionable spindle, while the use of the stationary cutting tool requires that the latter tool is secured to the lockable and rotationally positionable spindle and the workpiece is secured to the continuously rotatable spindle. This has the advantage that the two spindles can be designed for their respective functions, viz. continuous rotation and rotationl positioning, and the locking feature can be provided on the rotationally positionable spindle, which spindle may be more suitable for this purpose. Also, this method is appropriate for machining of individual blanks as distinct from the machining of workpieces at the end of bar stock.

According to another more specific aspect of the invention, there is provided a method of operating a machine tool; in which machine tool one of said spindles is a single-function spindle in that it is only continuously rotatable, the other spindle is a dual function spindle in that it is optionally continuously rotatable and rotationally positionable; the method comprising locking the single function spindle against rotation, securing the workpiece to the dual function spindle, and rotating the latter spindle continuously for performing the cutting operation against the stationary cutting tool as secured to the locked spindle. This method requires the introduction of the dual function spindle and its attendant costs, but it allows the workpiece to be held on the same spindle, viz. the dual function spindle, both when using the rotary and the stationary cutting tools. This method is therefore more suitable where the workpiece is formed at the end of bar stock fed through the interior of a hollow said dual function spindle.

BRIEF DESCRIPTION OF THE DRAWINGS

Preferred examples of the method and of machine tools according to this invention will now be described with reference to the accompanying drawings wherein:

FIG. 4 is an enlarged and sectional detail of FIG. 1,

DETAILED DESCRIPTION OF THE PREFERRED EXAMPLES

Figure 1:
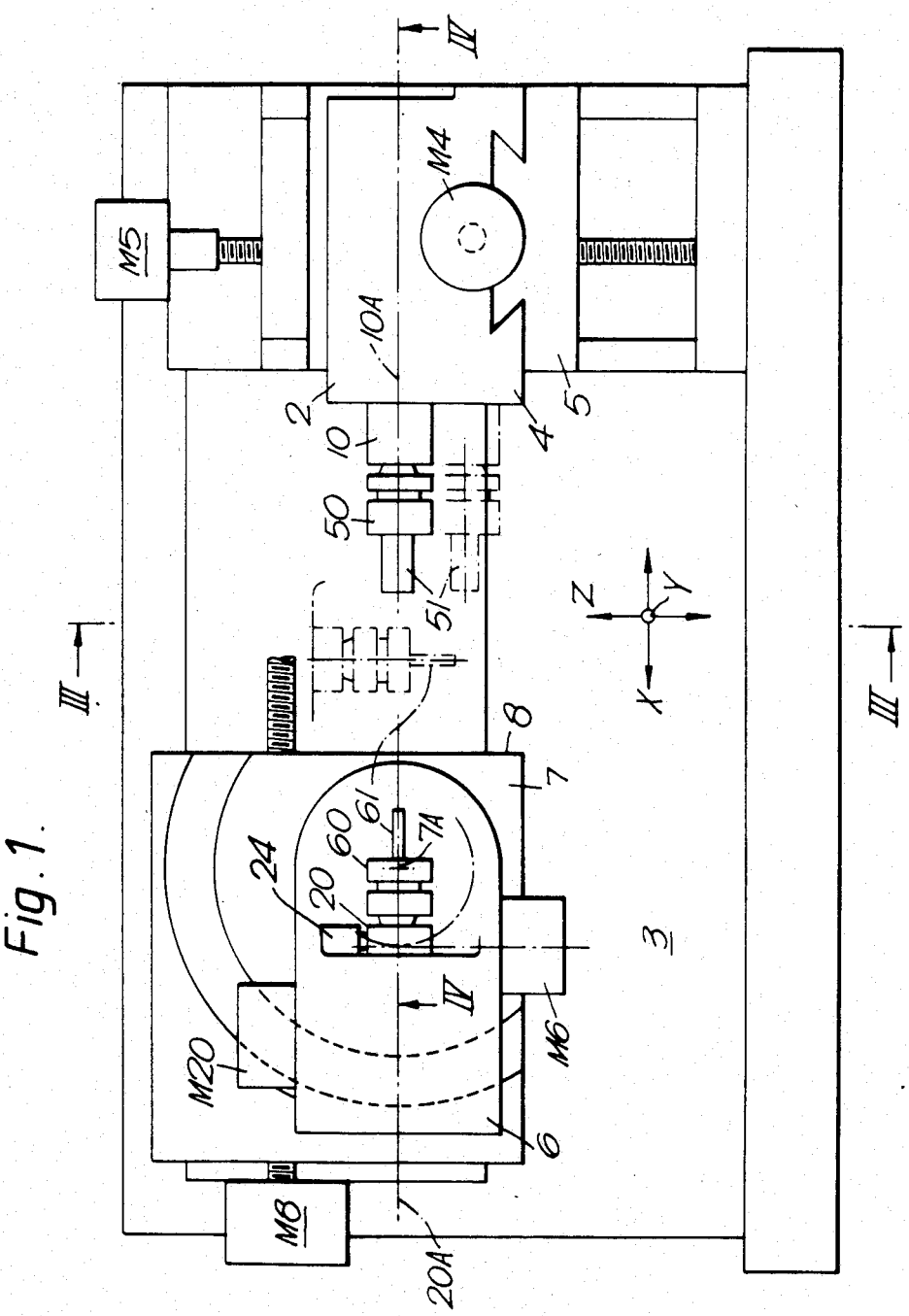
FIG. 1 is an elevation of the machine.
Figure 2:
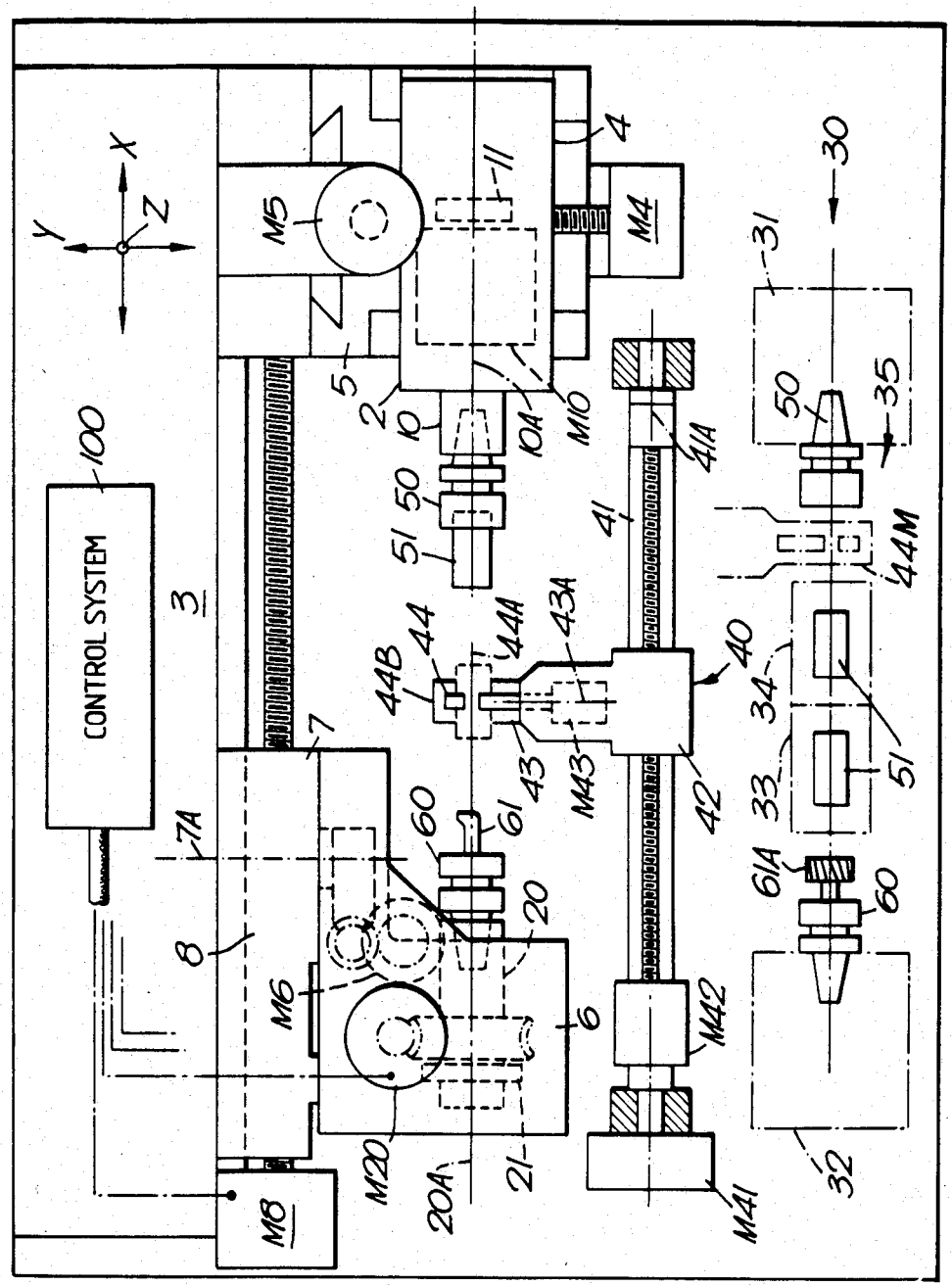
FIG. 2 is a plan view of the machine.
Figure 3:
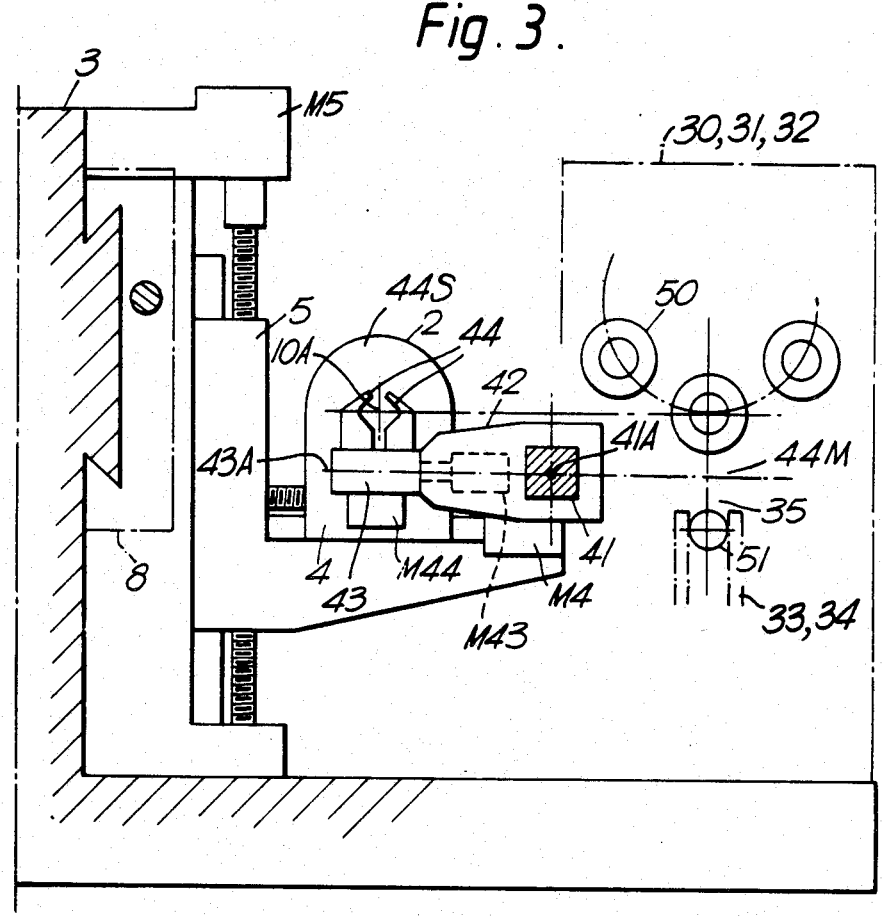
FIG. 3 is a section on the line III—III in FIG. 1.
Figure 6:
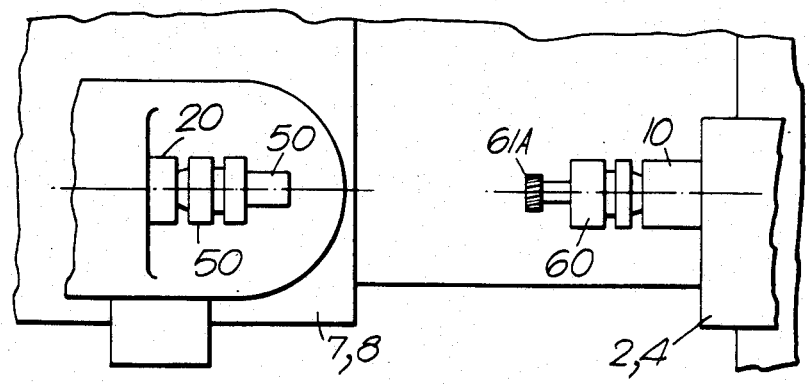
FIG. 6 is a part view similar to FIG. 1 but showing a different mode of operation.

Referring to FIGS. 1 to 3, the machine is described with reference to the three mutually perpendicular directions X, Y, Z of the orthogonal coordinate system. The machine has a first spindle 10 having an axis 10A extending in the X-direction and supported for continuous rotation in a bearing 2 itself supported on a base 3 by slides 4,5 for linear motion in the X and Y directions. A second spindle 20 having an axis 20A lying in a plane including X and Z directions, is supported for rotational positioning about the axis 20A in a bearing 6 itself supported by a bearing 7 for angular positioning about an axis 7A extending in the Y-direction. The bearing 7 is supported on the base 3 by a slide 8 for linear motion in the X-direction. The spindles 10,20 have respective operating ends to each of which is securable either a work holder 50 or a tool holder 60. FIGS. 1 to 4 show the holders 50,60 secured respectively to the spindles 10,20, and the holder 50 is shown as supporting a workpiece 51 while the holder 60 is provided with a stationary cutting tool being a turning tool 61. FIG. 6 shows the workpiece 51 as secured to a holder 50 secured to the spindle 20 while a rotary cutting tool being a milling cutter 61A is provided on the holder 60 and the latter is secured to the spindle 10. The motion of the slides 4,5,8, of the bearing 6, and of the spindles 10,20 are effectable by numerically controlled motors M4,M5,M6,M8,M10, and M20 respectively. The motors are controlled by a numerical control system 100. It will be clear that the holders 50,60 are universally movable one relative to the other and that all surfaces of the workpiece are accessible to the tools 61,61A except, of course, the surfaces for the time being concealed in the work holder 50.

Each spindle 10,20 is lockable against rotation, in a predetermined angular position relative to the respective bearings 2,6 (FIGS. 2, 4). Regarding the spindle 10, the locking operation involves separating the spindle 10 from the continuously rotatable motor M10. To this end, the disc 12 secured to the spindle 10 has a hole 12A proximate to said predetermined angular position and cooperating with a photo-electric device 13 to provide a signal 13A when the spindle has said proximate position. An electro-magnetic brake 11 has an armature 11A splined to the spindle 10 and arranged normally to transmit torque from the motor to the spindle. On occurrance of the signal 13A the brake 11 attracts the armature 11A to the housing 2 thereby stopping the spindle. Thereafter a positive locking device, e.g. a tapered plunger 14 mounted on the housing 2 is electro-magnetically driven into a recess 14A in the spindle simultaneously with the brake 11 being released. This enables the plunger to force the spindle into said predetermined angular position. The spindle 20, being rotationally positionable, is more readily haltable in a predetermined angular position than the continuously rotatable spindle 10. The motor M20 is a stepping motor and may be halted in any selected position within the resolution of the motor system. However an electro-magnetically operable plunger 24 and recess 24A provide a positive lock for the spindle.

Further (FIG. 4), the spindle 20, in addition to being rotationally positionable by the motor M20, may also be continuously rotatable by a motor (not shown) acting on a pulley 23, the change between the continuous and the positioning drive being effected by an electro-magnetic clutch 21 operable to connect the spindle 20 selectively to the pulley 23 or to a worm gear 22 driven by the motor M20.

The machine includes a magazine system 30 (FIGS. 2, 3) comprising a work holder magazine 31, a tool holder magazine 32, a magazine 33 for blank workpieces, and a magazine 34 for finished workpieces. The magazine 31 stores different holders 50 adapted for workpieces of different diameters or shapes. The magazine 32 stores tool holders 60 having turning or milling tools for different turning or milling operations. The magazines 31 to 34 are spaced from the spindles 20 in the Y-direction and are themselves spaced apart in the X-direction. The control system 100 is programmable to present any work holder, tool holder or blank workpiece contained in the respective magazines 31,32,33 at a pick-up station 35 and to receive a finished workpiece at said station 35.

Figure 5:
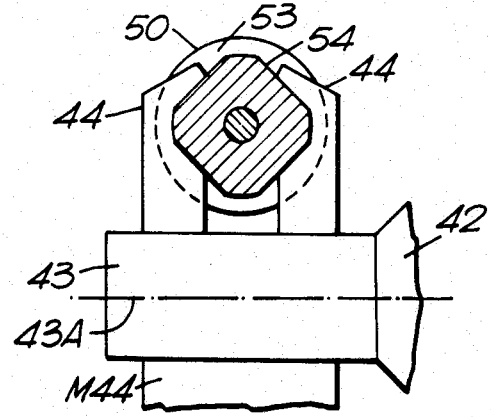
FIG. 5 is a section on the line V—V in FIG. 4.

Further, the machine includes a transfer mechanism 40 (FIGS. 2, 3, 5) comprising a shaft 41 having an axis 41A and extending in the X-direction in a position between the spindles 10,20 and the system 30. An arm 42 is supported on the shaft 41 for axial motion therealong but against rotation relative thereto. The arm 42 has a hand 43 rotatable about an axis 43A perpendicular to the shaft axis 41A and supporting a pair of gripper fingers 44 having a gripper axis 44A. Motors M41,M42,M43 (FIGS. 2, 3) and M44 (FIGS. 3, 5), also operable by the system 100, are provided for moving the arm 42 along the shaft 41 rotating the shaft about its axis 41A, rotating the hand 43 about the axis 43A and opening or closing the fingers 44.

The arrangement is such that, by rotation of the shaft 41 about the axis 41A and rotation of the hand 43 about the axis 43A, the fingers 44 are movable between a position 44S (FIG. 2), in which the axis 44A is aligned with the axis 20A (assuming the latter to lie in the X-direction) and a position 44M in which the axis 44A is aligned with the pick-up station 35. Further, by movement of the arm 42 axially along the shaft 41 the fingers 44 are movable into proximity with the individual magazines 31 to 34. The axial movement of the arm 42 and rotation of the hand 43 are preferably carried out during the angular motion of the arm 42 between said positions 44S,44M.

It will be seen that the transfer mechanism 40 is able to transfer blank or finished workpieces 51, or any holder 50 or 60, between either spindle 10,20 and the appropriate one of the magazines. The rotation of the hand 43 is used when the holder 50 or 60 has to be turned from a position it has in its magazine to the position it needs for a particular one of the spindles 10 or 20. Similarly, the rotation of the hand 43 is used for reversing the workpiece 51 end-to-end and for transferring the workpiece from a work holder 50 secured to one of the spindles 10,20 to a work holder secured to the other one of these spindles or reversing the work holder with the workpiece in it.

The work holder 50 (FIGS. 4, 5) has a housing 52 having a groove 53 engageable by the fingers 44 of the mechanism 40. The groove 53 has a square bottom 54 (FIG. 5) cooperating with the fingers 44 to determine the angular position of the holder about its axis 50A when held by the fingers 44. The housing 52 has a conical spigot 55 (FIG. 4) engageable with a conical socket 15 of the spindle 10 when presented thereto by the mechanism 40. The spindle 10 supports a nut 16 engageable with a screw-threaded end 57 of the spigot 55 to draw the socket into firm engagement with, or release the nut from, the socket by means of an actuator M16 adapted to rotate the nut. The spigot 53 has a key 56 engageable with a key way 18 in the socket to determine the angular position of the holder 50 and thus of the workpiece on the spindle 10 about the axis 10A. The socket 15, spigot 55, threaded end 57 and the nut 16 define a coupling means for releasably securing the holder 50 on the spindle 10. The work holder 50 includes gripper jaws 58 operable by a member 59 in the housing 52 acted on by a rod 17 in the spindle 10 to grip or release the workpiece. The rod 17 is operable by an actuator M17.

The spindle 20 is provided with a socket 25, nut 26 and rod 27 identical to the socket 15, nut 16 and rod 17 of the spindle 10 so that the holder 50 can be secured to the spindle 20 by an actuator M26 and operated by an actuator M27 in the same way as in respect of the spindle 10. The actuators M16,M17,M26,M27 are operable by the system 100. The tool holder 60 has a housing 62, groove 63 with square bottom 64, and a spigot 65, key 66 and threaded end 57 engageable with a keyway 28 of the spindle 20, all the same as the components 52 to 57 of the holder 50 so that the holder 60 can be secured to either spindle 10,20 in the same way as the holder 50.

The keys 56,66, square bottoms 54,64, keyways 18,28 and the facility of locking the spindles 10,20 in predetermined angular positions about their axes 10A,20A, all cooperate to make it possible for the holders 50,60 to be transferred between the magazines 31,32 and the spindles 10,20 in a predetermined angular registration with the respective spindles. The keys 56,66 are required for transmission of torque and the holder 50 or 60 has to be in register with the respective keyways 18,28 to make it possible for the holder to be connected to the spindle in an automatic system. To satisfy the above requirements, also the magazines 31,32 have means (not shown) cooperating with the keys 56,66 to locate the holders 50,60 in given angular positions, and as already mentioned, the spindles are each lockable by the brakes 11,21 in predetermined angular positions about their axes i.e. relative to the respective bearings 2,6.

As mentioned, and as shown, the work holder 50 and tool holder 60 are secured respectively to the headstock spindle 10 and support spindle 20. This is the requirement for a turning operation. The opposite is the case for a milling operation, i.e. the holders 50,60 are then secured respectively to the spindles 20,10.

To prepare the machine for a turning operation, and to carry out that operation, the system 100 is programmed to carry out the following steps.

1. Moving the slides 4,5 and rotating the bearing 6 to bring the spindles 10,20 into axial alignment, moving the slide 8 to bring the spindle 20 into a predetermined axial distance from the spindle 10, rotating the spindles 10,20 into predetermined angular positions to ensure that the keyways of the sockets 15,25 are correctly positioned, and locking the spindles 10,20 against rotation about their axes 10A,20A.

2. Operating the magazine system 30 to bring a preselected work holder 50 and tool holder 60 to the pick-up station 35, and to bring a first, or a next, blank workpiece to the station 35.

3. Operating the transfer mechanism 40 to transfer the selected work holder 50 to the spindle 10, and operating the nut 16 to secure the work holder.

4. Operating the mechanism 40 to transfer the selected tool holder 60 to the spindle 20, and operating the nut 26 to secure the tool holder.

5. Operating the mechanism 40 to transfer the workpiece 51 to the work holder 50 secured to the spindle 10, and operating the rod 17 to grip the workpiece.

6. Operating the slide 5 to ensure that the cutting edge of the turning tool lies in a plane intersecting the axis 10A.

7. Rotating the spindle 10 and operating the slides 4,8 to perform the turning operation.

Depending on the nature of the turning operation, the system 100 is programmed to rotate the spindle 20 about the axis 7A into any position between the position in which the axes 10,20A are parallel and, say, the position in which these axes are mutually perpendicular as shown in chain-dotted lines in FIG. 1.

When it is required to follow the turning operation by a milling operation, the system 100 is programmed to return the tool holder 60 to the magazine system, remove the work holder 50 (with the workpiece therein) from the spindle 10, reverse the work holder end-to-end by rotating the hand 43 of the transfer mechanism 40, secure the work holder to the spindle 20, transfer a pre-selected tool holder 60 with a milling tool 61A (FIG. 6) therein from the magazine system to the spindle 10, and finally perform the milling operation by rotating the spindle 10, moving slides 4,5 or 8 or, for universal milling, angularly position the spindle 20 about the axes 20A or 7A, as the case may require.

If the end of the workpiece hitherto held by the holder 50 requires machining, the system is programmed to operate the transfer mechanism 40 to remove the workpiece from the holder 50, reverse it end-to-end by rotation of the hand 43 and return it to the holder 50.

Figure 7:
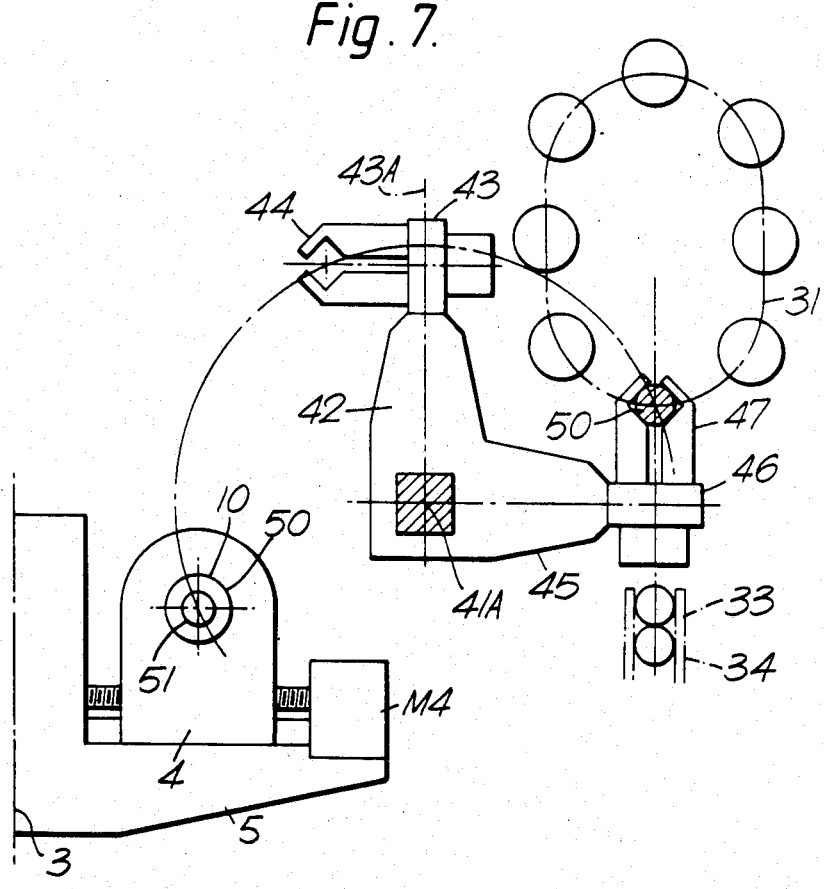
FIG. 7 is a view similar to FIG. 3 but showing a modification.

Referring to FIGS. 6 and 7 the transfer mechanism 40 may include an arm 45, a hand 46 and fingers 47 essentially the same as the arm 42, hand 43 and fingers 44 except in that the arm 45 is arranged at an angle, in this case 90°, to the arm 42. This arrangement makes it possible to change a work holder 50 with one set of fingers while holding the workpiece with the other set of fingers. The need for this arises when one end of the workpiece has been machined and the workpiece has to be turned round for machining the end hitherto held by the work holder. The machined end would usually have a shape or a diameter different from the hitherto unmachined end, and in many cases a different holder is required for holding the machined end. The provision of the two arms 42,45 makes it possible, by appropriate rotation of the shaft 45, to move the fingers 44,47 alternatively into the operative relationship with the relevant spindle, say the spindle 10, so that the workpiece can be removed by the fingers 44 and, while the fingers 44 hold the workpiece, fingers 47 are used to remove the holder from the spindle, transfer the holder to the magazine 31, and transfer a new holder to the spindle. The hand 43 is then rotated to turn the workpiece end-to-end and the mechanism 40 is operated by rotation of the motor M42 (FIG. 2) to insert the workpiece into the new holder. More than two arms, e.g. three arms, may be provided on the shaft 41 in equi-spaced relationship about the axis 41A so that a work holder present on the spindle 10 can be removed by the second arm and replaced by a work holder held ready in the third arm while the first arm holds the workpiece.

FIG. 3 shows the fingers 44 offset from the axis 43A of the hand 43, and the opening between the fingers faces in a direction transverse to the axis 43A. This makes it possible for the fingers to approach the magazines and the spindles by rotation of the shaft 41 as distinct from transverse movement of this shaft. The arrangement also makes it possible for the magazines 31,32 to be above the level of the axis 41A while the magazines 33,34 are below that level whereby the capacity of the magazine system is considerably increased. However the amount of offset of the fingers is kept to a minimum to minimise an inevitable movement of the slide 5 required when the workpiece is turned end-to-end.

I claim:
1. Machine tool comprising:
   (a) two spindles;
   (b) two work holders;

(c) gripper elements for releasably gripping a workpiece provided at each work holder;
(d) a tool holder;
(e) storage means for storing said holders;
(f) first support means provided at one of said spindles for releasably supporting said tool holder;
(g) second support means provided at said other spindle for releasably supporting one of said work holders;
(h) transfer means for moving said tool holder between said storage means and said first support means and for moving a selected one of said work holders between said storage means and said second support means; wherein the improvement comprises:
(i) said first and second support means each being arranged to individually releasably support one of said work holder and said tool holder;
(j) each said spindle including means for operating the gripper elements of a work holder, as supported at a respective one of the spindles, to grip and release a workpiece held by said work holder; and
(k) said transfer means being constructed for moving each of said holders, respectively between said storage means and said first and second support means, respectively, for moving a workpiece between said two work holders as supported at a respective one of said spindles.

2. Machine tool according to claim 1, wherein each said holder has a conical spigot and said first and second support means provided at said spindles, respectively, each comprise respective identical conical sockets for the reception of a respective one of said conical spigots provided on said work holders and on said tool holder.

3. Machine tool according to claim 2 wherein, said spindles each comprise respective identical devices for urging the respective conical spigots of said work holders and said tool holder into engagement with the respective sockets.

4. Machine tool according to claim 1, wherein said transfer means comprises a gripper hand for gripping each of said holders.

5. Machine tool according to claim 4 including means for rotating said gripper hand for positioning a selected one of said holders for support by a selected one of said spindles.

6. Machine tool according to claim 4, wherein said transfer means comprises two gripper hands each adapted to grip a selected one of said holders.

7. Method of operating the machine tool claimed in claim 1, comprising:
(a) transferring one of said work holders from said storage means to one of said spindles;
(b) transferring said tool holder from said storage means to said other spindle;
(c) machining a free part of a workpiece held in said one work holder by a tool held in said tool holder;
(d) transferring said tool holder from said other spindle to said storage means;
(e) transferring the other of said work holders from said storage means to said other spindle;
(f) transferring the workpiece from the one to the other of the work holders so that a part of the workpiece machined at step (c) above is gripped by said other work holder and a part of the workpiece held in said one work holder at step (c) becomes available for machining;
(g) transferring a tool holder with a tool thereon from said storage means to said one spindle; and
(h) machining the workpiece as supported by said other spindle by means of the tool supported by said one spindle.

8. The method according to claim 7, wherein said transfer means comprises two gripper hands each constructed to grip a selected one of said holders and said method further comprises using one of said gripper hands as a temporary storage location for one of said holders.

* * * * *